US012657380B1

(12) United States Patent
Legatski

(10) Patent No.: US 12,657,380 B1
(45) Date of Patent: Jun. 16, 2026

(54) INTERMEDIATE WHITEBOARD SNAPSHOTS

(71) Applicant: Zoom Communications, Inc., San Jose, CA (US)

(72) Inventor: Richard Dean Legatski, Castle Rock, CO (US)

(73) Assignee: Zoom Communications, Inc., San Jose, CA (US)

( * ) Notice: Subject to any disclaimer, the term of this patent is extended or adjusted under 35 U.S.C. 154(b) by 220 days.

(21) Appl. No.: 18/397,414

(22) Filed: Dec. 27, 2023

(51) Int. Cl.
　　*G06F 40/197* 　　(2020.01)
　　*G06F 3/0482* 　　(2013.01)
　　*G06F 40/169* 　　(2020.01)
　　*G06T 11/60* 　　(2026.01)

(52) U.S. Cl.
　　CPC .......... *G06F 40/197* (2020.01); *G06F 3/0482* (2013.01); *G06F 40/169* (2020.01); *G06T 11/60* (2013.01); *G06T 2200/24* (2013.01)

(58) Field of Classification Search
　　CPC .... G06F 40/197; G06F 3/0482; G06F 40/169; G06T 11/60; G06T 2200/24
　　See application file for complete search history.

(56) References Cited

U.S. PATENT DOCUMENTS 5,790,114 A * 8/1998 Geaghan ............... G06F 3/0488
　　　　　　　　　　　　　　　　　　345/174
6,332,147 B1 * 12/2001 Moran .................. G06F 16/489
　　　　　　　　　　　　　　　　　　715/231

| | | | |
|---|---|---|---|
| 8,806,354 | B1 * | 8/2014 | Hyndman ............. H04L 65/403 |
| | | | 709/204 |
| 10,769,365 | B2 * | 9/2020 | Fern ...................... G06F 40/117 |
| 11,055,055 | B1 * | 7/2021 | Fieldman ................ G06T 11/60 |
| 11,281,423 | B1 * | 3/2022 | Fieldman ................ G06F 9/451 |
| 2005/0104902 | A1 | 5/2005 | Zhang et al. |
| 2007/0120871 | A1 * | 5/2007 | Okamoto ............ G06F 3/04855 |
| | | | 345/619 |
| 2010/0023851 | A1 * | 1/2010 | Schormann ............ G06Q 10/10 |
| | | | 715/232 |
| 2010/0306018 | A1 * | 12/2010 | Burtner .................. G06Q 99/00 |
| | | | 705/7.19 |
| 2013/0113804 | A1 * | 5/2013 | Ferman ............. G06Q 10/0633 |
| | | | 345/440 |
| 2013/0271403 | A1 * | 10/2013 | Nagahara .............. H04L 67/131 |
| | | | 345/173 |
| 2014/0043366 | A1 * | 2/2014 | Tsukuda .................... G06F 3/14 |
| | | | 345/634 |

(Continued)

OTHER PUBLICATIONS

Microsoft Support, How to turn on AutoRecovery in Visio, https://support.microsoft.com/en5-us/topic/how-to-turn-on-autorecovery-in-visio-72c14407-bd2b-1478-6073-3173826659ee#:~:text=On%20the%20Tools%20menu%2C%20click,operations%2C%20and%20then%20click%20OK., Retrieved from Internet Dec. 27, 2023.

(Continued)

*Primary Examiner* — Asher D Kells
(74) *Attorney, Agent, or Firm* — Young Basile Hanlon & MacFarlane, P.C.

(57) ABSTRACT

A virtual whiteboard is modified responsive to editing commands. Each of the editing commands results in a respective state of the virtual whiteboard. At least some of the respective states are stored as whiteboard snapshots. A command to display one of the whiteboard snapshots is received. Based on the command, a user interface associated with the virtual whiteboard is updated according to the one of the whiteboard snapshots.

20 Claims, 10 Drawing Sheets

(56)     References Cited

U.S. PATENT DOCUMENTS

| | | | |
|---|---|---|---|
| 2014/0223377 A1* | 8/2014 | Shaw | G06F 3/0482 |
| | | | 715/835 |
| 2014/0365918 A1* | 12/2014 | Caldwell | G06F 3/0481 |
| | | | 715/753 |
| 2015/0007054 A1* | 1/2015 | Qu | H04L 65/1096 |
| | | | 715/753 |
| 2015/0355824 A1* | 12/2015 | Ueno | G06F 3/04845 |
| | | | 715/751 |
| 2018/0012194 A1* | 1/2018 | Aoki | H04L 65/403 |
| 2018/0292964 A1* | 10/2018 | Snyder | G06F 3/0488 |
| 2019/0146949 A1 | 5/2019 | Kothari et al. | |
| 2019/0286255 A1* | 9/2019 | Kawasaki | G06F 3/0421 |
| 2021/0126955 A1* | 4/2021 | Nagaoka | H04L 65/403 |
| 2021/0286486 A1* | 9/2021 | Shelke | G06F 3/0484 |
| 2021/0390253 A1 | 12/2021 | Gelman et al. | |
| 2022/0124128 A1 | 4/2022 | Port et al. | |
| 2023/0350700 A1* | 11/2023 | Rane | G06F 40/174 |
| 2024/0031653 A1* | 1/2024 | Ozaki | H04N 21/4312 |
| 2024/0040084 A1* | 2/2024 | Mayfield | G06F 3/1454 |
| 2024/0364759 A1* | 10/2024 | Daniel | H04L 65/4015 |

OTHER PUBLICATIONS

Microsoft Support, How do I turn on AutoSave?, https://support.
microsoft.com/en-us/office/how-do-i-turn-on-autosave-dbd19b49-
ff3a-48f5-8294-671e33a6712c, Retrieved from Internet Dec. 27,
2023.

* cited by examiner

410
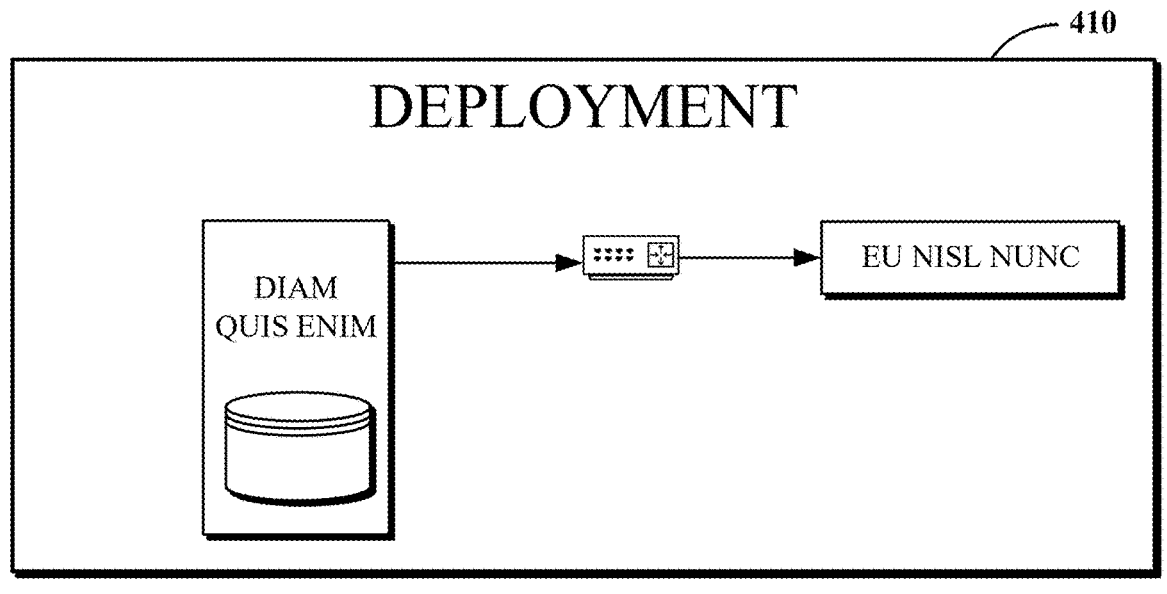
420
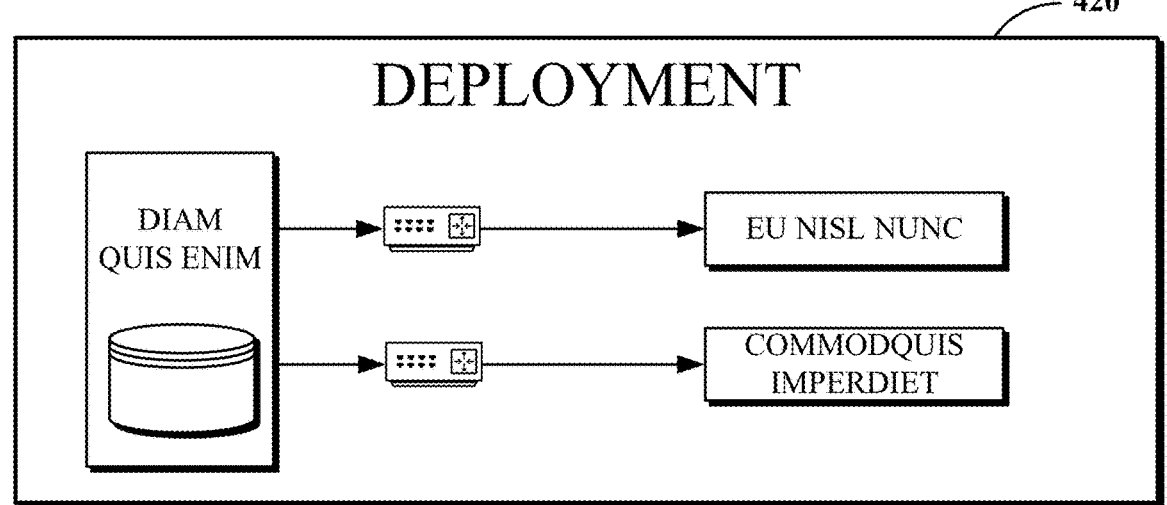
430
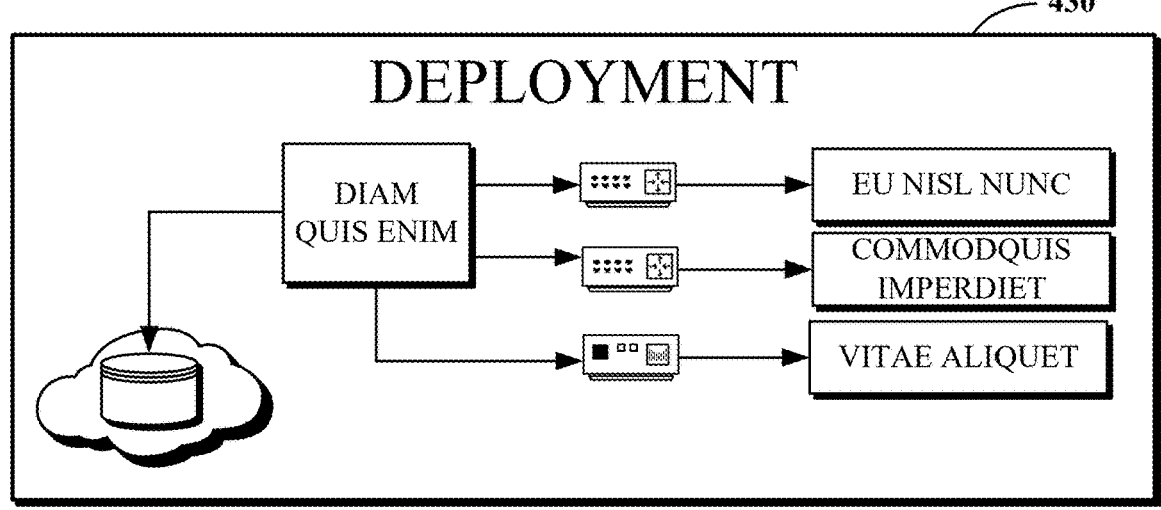
FIG. 4B

Figure 7:
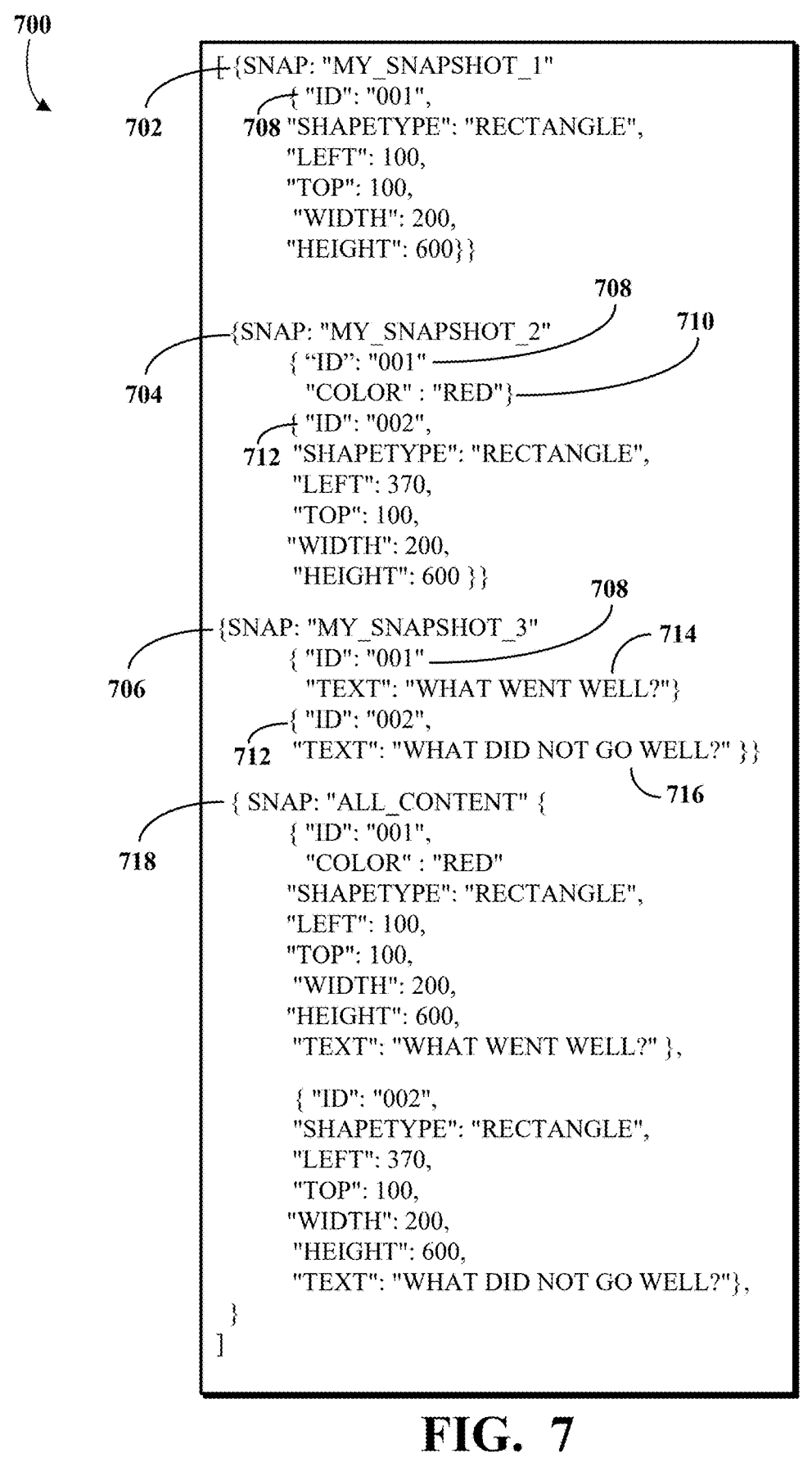

700

{SNAP: "MY_SNAPSHOT_1"
    { "ID": "001",
     708 "SHAPETYPE": "RECTANGLE",
      "LEFT": 100,
      "TOP": 100,
      "WIDTH": 200,
      "HEIGHT": 600}}

708
710
{SNAP: "MY_SNAPSHOT_2"
    { "ID": "001"
     "COLOR" : "RED"}
    { "ID": "002",
    712 "SHAPETYPE": "RECTANGLE",
     "LEFT": 370,
     "TOP": 100,
     "WIDTH": 200,
     "HEIGHT": 600 }}

708
714
{SNAP: "MY_SNAPSHOT_3"
    { "ID": "001"
     "TEXT": "WHAT WENT WELL?"}
    { "ID": "002",
    712 "TEXT": "WHAT DID NOT GO WELL?" }}
716
{ SNAP: "ALL_CONTENT" {
    { "ID": "001",
     "COLOR" : "RED"
    "SHAPETYPE": "RECTANGLE",
    "LEFT": 100,
    "TOP": 100,
    "WIDTH": 200,
    "HEIGHT": 600,
    "TEXT": "WHAT WENT WELL?" },

{ "ID": "002",
    "SHAPETYPE": "RECTANGLE",
    "LEFT": 370,
    "TOP": 100,
    "WIDTH": 200,
    "HEIGHT": 600,
    "TEXT": "WHAT DID NOT GO WELL?"},
    }
]

INTERMEDIATE WHITEBOARD SNAPSHOTS

FIELD

This disclosure generally relates to whiteboards, and, more specifically, to capturing and interacting with intermediate whiteboard snapshots.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 4A-B illustrate a scenario underscoring benefits and uses of capturing whiteboard snapshots.

FIG. 7 illustrates an example of whiteboard content of a whiteboard.

DETAILED DESCRIPTION

Figure 1:
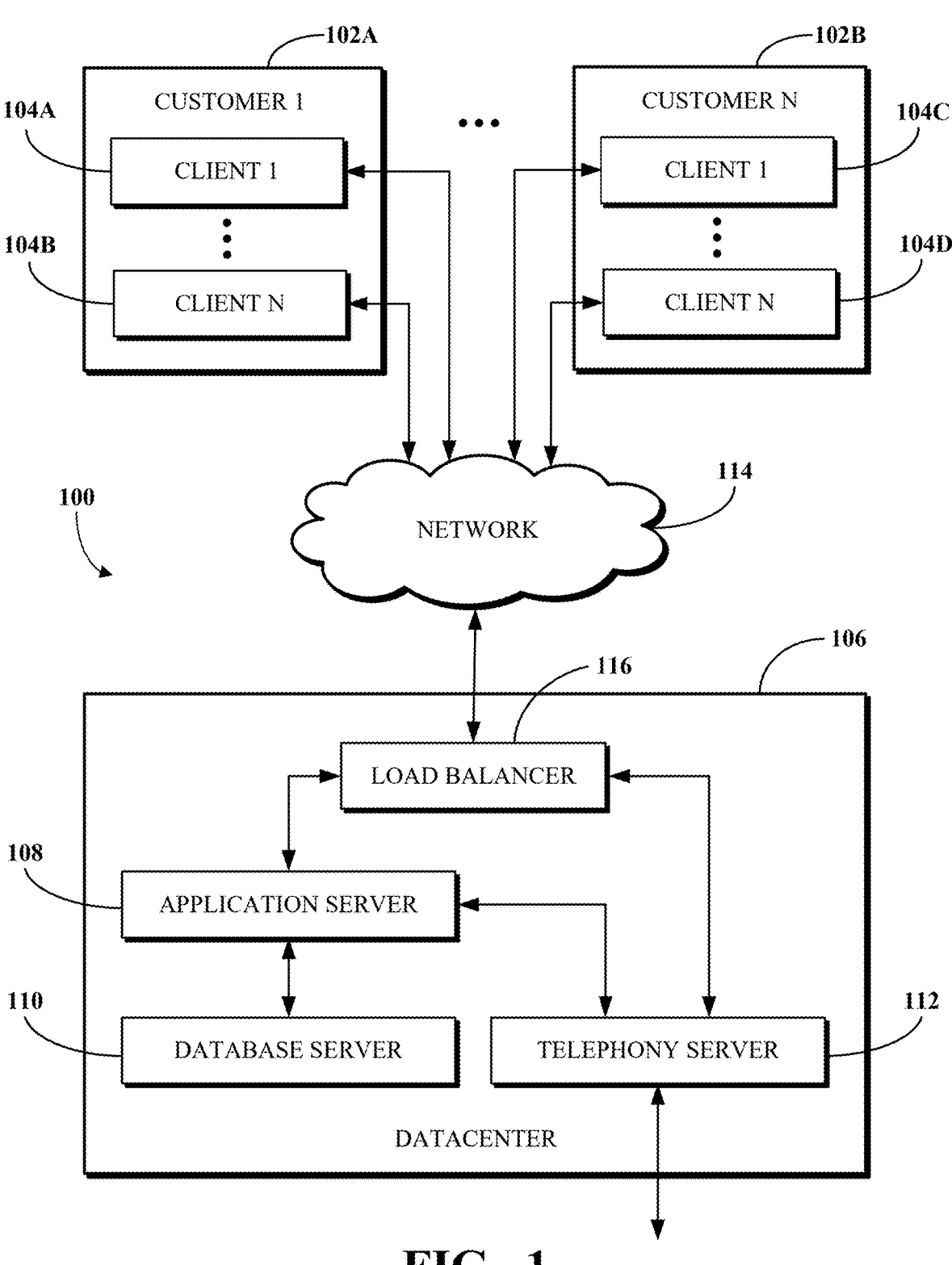
FIG. 1 is a block diagram of an example of an electronic computing and communications system.

A virtual whiteboard, also referred to herein as a whiteboard, is a virtual space within which a number of people can collaborate. Users of a virtual whiteboard software may collaborate by adding, modifying, and/or removing content (e.g., text boxes, drawing spaces, and sticky notes) within a virtual canvas that visually represents a whiteboard. Users of a virtual whiteboard software may access a whiteboard individually, or they may participate in an active whiteboard session (i.e., a real-time event in which a whiteboard is simultaneously accessed by multiple users) to create documents (e.g., drawings or flowcharts), brainstorm ideas, and otherwise work together towards, for example, a project goal. For example, users of a virtual whiteboard software may participate in an active virtual whiteboard session via a video conference, in which the users are participants to the video conference and the whiteboard can be shared to the video conference to facilitate the active virtual whiteboard session.

The virtual whiteboard software may provide tools or commands usable by users to modify a whiteboard. Modifying (e.g., editing) a whiteboard can include one or more of adding content to the whiteboard, deleting content from the whiteboard, changing content of the whiteboard, or changing the arrangement of content in the whiteboard. In terms of data representation, the "state" of a whiteboard is characterized by the set of graphical elements representative of the whiteboard contents, their properties, and their arrangements. The state of the whiteboard can be represented as a stored representation and as a display representation. The stored representation can be one or more objects or data structures that can be stored in a data store (e.g., a database). The virtual whiteboard software is configured to retrieve a stored representation and transform it into graphical elements to be rendered on a canvas.

Edit commands are used to modify (e.g., alter) the state of the whiteboard. Users can initiate a preservation of the state of the whiteboard by invoking, for example, a save command. Each invocation of the save command supersedes the state previously stored. In addition, or as an alternative, the virtual whiteboard software may be configured to autonomously save the state of the whiteboard at regular intervals, thus supplanting the state saved in the immediately preceding cycle.

In certain scenarios, users may desire to retain various given states (referred to herein as "snapshots") of the evolution of a whiteboard. For instance, during a complex problem-solving session, participants may find value in preserving the sequential or chronological progression of ideas, thereby facilitating retrospective analyses or reverting to a prior state should the need arise. Additionally, users may want to preserve given states as reference points and to safeguard against the loss of collaborative input. Furthermore, users may want to use the snapshots as pedagogical tools to elucidate complex concepts or processes for educational, presentation, or training purposes. However, conventional whiteboard software lack the technical capabilities to enable users to capture given snapshots of whiteboards.

Implementations of this disclosure address problems such as these via a whiteboard software that is configured to enable users to cause a whiteboard software to capture and store intermittent states of a whiteboard as distinct snapshots (e.g., distinct states). Each snapshot captures (e.g., stores) the state of the whiteboard as laid out on the canvas at the time of the capture. To be clear, a "snapshot," as used herein, is more than a mere static image (e.g., a screen shot) of an intermittent state. Rather, a snapshot is a comprehensive record that encapsulates not only the visual representation but also the underlying data associated with the whiteboard at the moment of capture. In one implementation, a virtual whiteboard is modified responsive to editing commands, where each of the editing commands results in a respective state of the virtual whiteboard. At least some of the respective states may be stored as whiteboard snapshots. A command to display one of the whiteboard snapshots may be received. Based on the command, a user interface associated with the virtual whiteboard can be updated according to the one of the whiteboard snapshots.

To describe some implementations in greater detail, reference is first made to examples of hardware and software structures used to implement a system for capturing and interacting with intermediate whiteboard snapshots. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
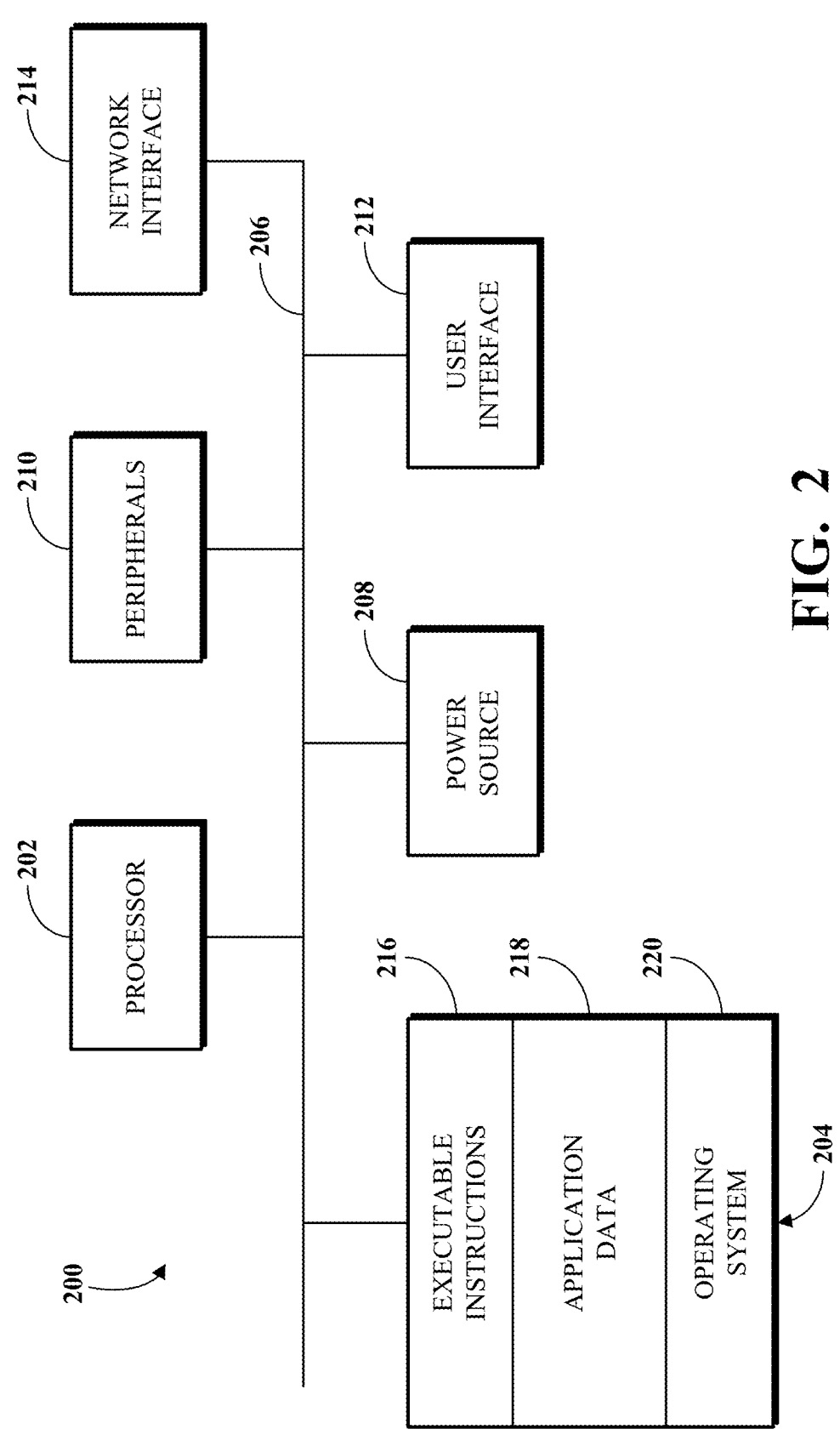
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
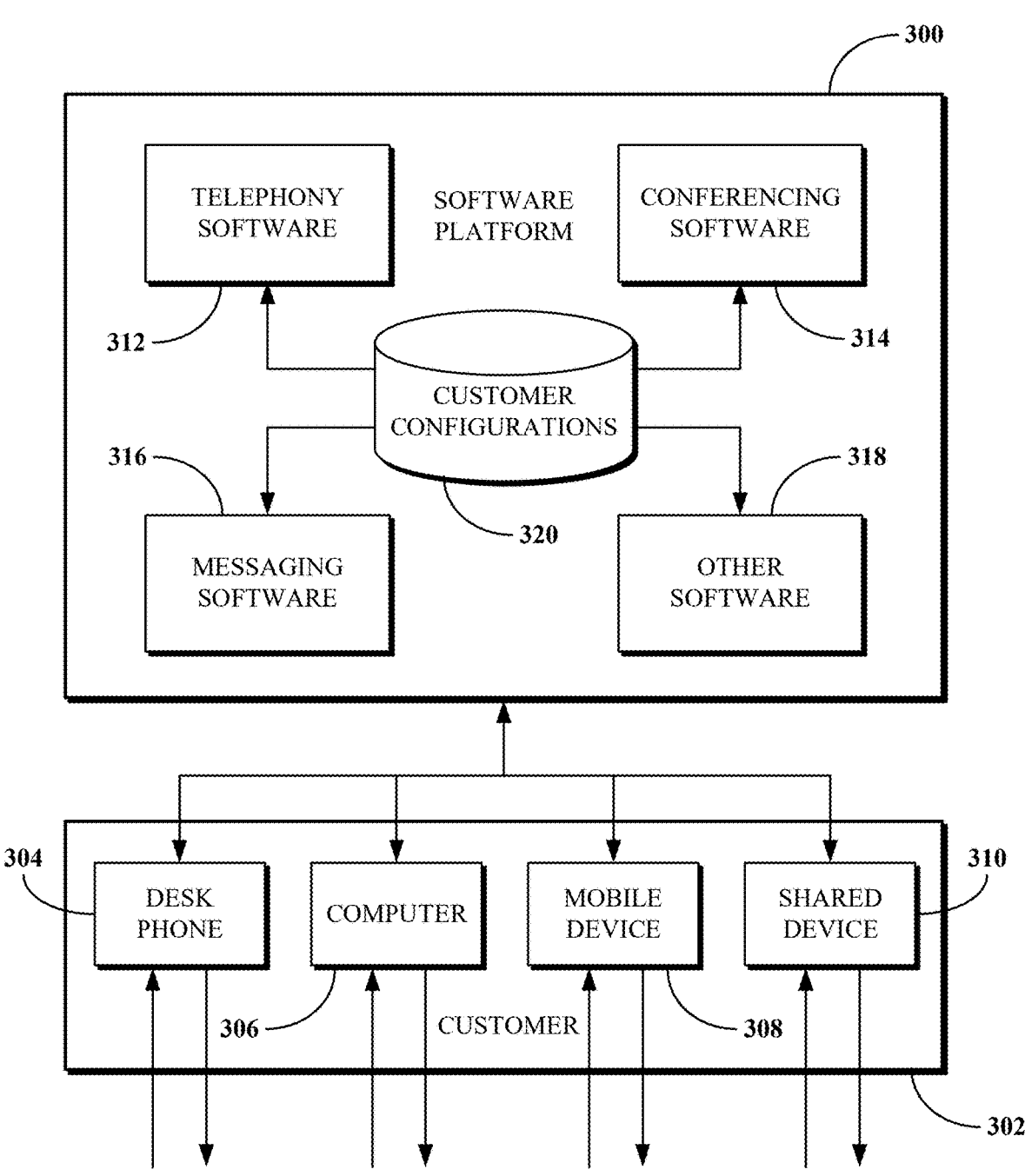
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include whiteboard software that is configured to enable users to capture and interact with intermediate whiteboard snapshots.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4A:
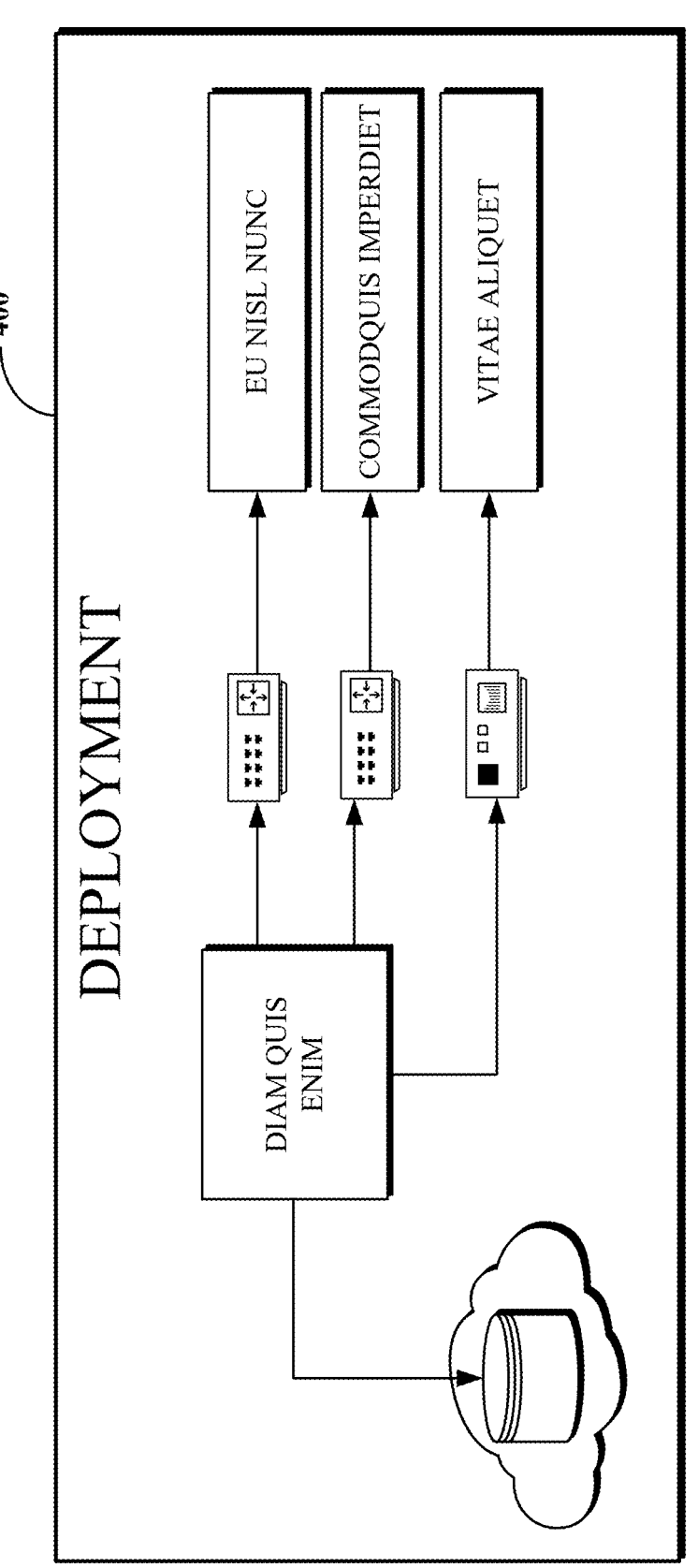

FIGS. 4A-B illustrate a scenario underscoring benefits and uses of capturing whiteboard snapshots. It is noted that the disclosure is not limited to or by any specific scenarios described herein. Any described scenarios are for illustration purposes and are provided merely by example to facilitate comprehension of the disclosure.

FIG. 4A illustrates a whiteboard 400 that represents a final phase of a planned system deployment project. The whiteboard 400 graphically displays the ultimate configuration of the system components as they are to be deployed. To illustrate the need for whiteboard snapshots, assume that the project will be rolled out in three phases. It is noted that statements such as "rendering or displaying a whiteboard" should be understood to mean "converting stored structure of the whiteboard into graphical elements for rendering on a canvas;" and "drawings on the whiteboard" should be understood to mean "drawing on a canvas associated with the whiteboard."

Conventionally, a whiteboard reflects only its latest saved state and it is not possible to capture and preserve the different states of the whiteboard representing, for example, different desired phases of a project, such as shown in whiteboard states 410, 420, and 430 of FIG. 4B. Conventionally, users might record (e.g., retain) given phases by duplicating elements of an initial phase (e.g., the whiteboard state 410), and after pasting these duplicates on the whiteboard, the users manipulate the duplicated objects to demonstrate a subsequent phase (e.g., the whiteboard state 420), repeating this process to depict further stages (e.g., the whiteboard state 430). Said another way, users might attempt to manually recreate a past state of a whiteboard (e.g., the whiteboard state 410), such as for discussion purposes. This generally involves duplicating elements from that past state into a current state. Users may then manipulate those duplicated elements to cause the whiteboard to enter a new state (e.g., the whiteboard state 420), repeating this process to depict further states (e.g., the whiteboard state 430). Such an approach is flawed as it clutters the workspace canvas and also inflates the data storage requirements for the contents of the whiteboard.

Figure 5:
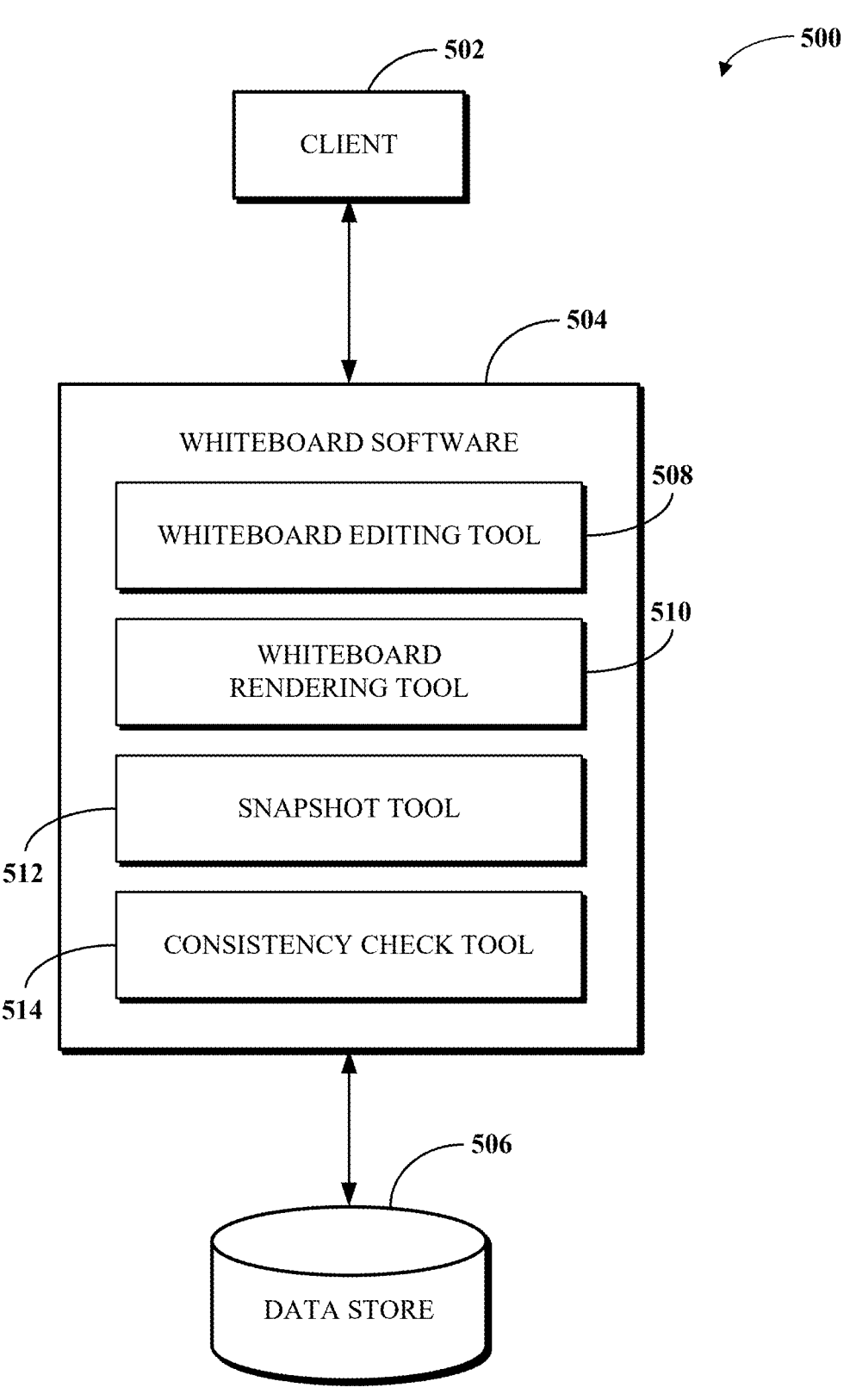
FIG. 5 is an example of a system for capturing and using whiteboard snapshots.

FIG. 5 is an example of a system 500 for capturing and using whiteboard snapshots. The system 500 is shown as including a client 502, a whiteboard software 504, and a data store 506.

The client 502 may be one of the clients 304 through 310 shown in FIG. 3 that runs a client application associated with the whiteboard software 504 or is otherwise usable to access a whiteboard and associated functionality implemented using the whiteboard software 504. Although one client is shown in FIG. 5, other numbers of clients can simultaneously connect to a whiteboard implemented using the whiteboard software 504.

The whiteboard software 504 enables a virtual canvas that users may be configured (e.g., enabled or permitted) to access. Different permissions may be associated with different users of a whiteboard. To illustrate, and without limitations, some users (having associated therewith a modify permission) may be permitted to create and modify (e.g., add, edit, or modify graphical elements thereon) a whiteboard and some other users (not having associated therewith the modify permission) may be permitted to only view the contents of the whiteboard or add comments to the whiteboard. Modifying (e.g., editing) a whiteboard can include one or more of adding content to the whiteboard, deleting content from the whiteboard, changing content of the whiteboard, or changing the arrangement of content in the whiteboard. Other permissions or combinations thereof are possible. In an example, users granted the modify permission to a whiteboard can create, modify, and delete whiteboard snapshots associated with the whiteboard; and users granted read-only permission (e.g., users who are not granted the modify permission) can only view and play the snapshots.

The whiteboard software 504 includes tools, such as programs, subprograms, functions, routines, subroutines, operations, executable instructions, and/or the like for, inter alia and as further described below, enabling users to create and edit whiteboards and to capture and view snapshots of (e.g., associated with) the whiteboards. At least some of the tools of the whiteboard software 504 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the whiteboard software 504 includes a whiteboard editing tool 508, a whiteboard rendering tool 510, a snapshot tool 512, and a consistency checking tool 514. In some implementations, the whiteboard software 504 can include more or fewer tools. In some implementations, some of the tools may be combined, some of the tools may be split into more tools, or a combination thereof.

The whiteboard editing tool 508 enables users, such as a user of the client 502, to modify whiteboards. A user can modify a whiteboard by adding graphical elements (e.g., text, shapes, images, stickers, icons, animations, hyperlinks, or videos) to the whiteboard. The user can associate properties with at least some of the graphical elements. To illustrate, properties associated with a rectangle may include a width, a height, a foreground color, a background color, and a text alignment; properties associated with a text graphical element may include a font name, a font size, and a font style; and properties associated with a group of graphical elements may include an alignment (e.g., top, left, center, etc.) of the graphical elements. The whiteboard editing tool 508 may enable the user, via user interface controls, to set such properties implicitly or explicitly. The whiteboard editing tool 508 may enable the user to add graphical elements via a toolbox. The toolbox may include primitive graphical elements (e.g., lines, boxes, circles, text, kanban board, etc.) that the user can add to their whiteboard.

The whiteboard software 504 maintains (e.g., stores), such as in the data store 506, locations of edited content or comments added to the whiteboard along with the respective users who added the content or made the comments.

The whiteboard editing tool 508 also enables users to create whiteboards. A new whiteboard may be instantiated from a whiteboard template. That is, the whiteboard software 504 may include or have access to a set (e.g., a list) of whiteboard templates. To illustrate, and without limitation, the list of whiteboard templates may include a Pros and Cons template, a Kanban Table template, a Mind Map template, a Sprint Retrospective template, an XY Plot template, a Bull's Eye template, and so on. Whiteboard templates (e.g., object descriptions thereof) may be stored in the data store 506. To create a whiteboard, a user may select a desired whiteboard template and cause the whiteboard editing tool 508 to create the whiteboard therefrom. Creating a whiteboard from a whiteboard template (also referred to as instantiating the whiteboard template) includes creating a copy of the whiteboard template as a starting point for the whiteboard.

The whiteboard rendering tool 510 renders a whiteboard on a display, such as a display of the client 502 or a display of the user interface 212 of FIG. 2. As mentioned, whiteboards are persistent objects and can be stored in the data store 506. In response to a request to retrieve a stored whiteboard, the whiteboard rendering tool 510 may retrieve the whiteboard (e.g., retrieve the stored representation thereof) from the data store 506 and cause the whiteboard to be rendered on a canvas at the display of the client 502. More accurately, the whiteboard, as visually displayed at the client 502, is a visual representation of the stored content and layout of the store representation of the whiteboard.

When a whiteboard is associated with multiple snapshots, the whiteboard rendering tool 510 may be configured to initially display one of the snapshots. For example, the whiteboard rendering tool 510 may be configured to render the initial (e.g., the first) snapshot, the final (e.g., the last or default) snapshot, or some other snapshot from an ordered list of snapshots. In an example, which of the whiteboard snapshots is rendered can be based on a user selection (e.g., a user configuration) or a system configuration.

The content and layout (e.g., the graphical elements of a whiteboard) may be stored in the data store 506 as a structured (e.g., a JavaScript Object Notation (JSON) or an Extensible Markup Language (XML)) document. The whiteboard rendering tool 510 retrieves the structured document, identifies the graphical elements therein, and renders these graphical elements at the client 502.

The snapshot tool 512 enables users to capture, edit, configure, and delete snapshots. The snapshot tool 512 also enables users to view and play whiteboard snapshots. The snapshot tool 512 is further described with respect to FIGS. 6A-6B. The terms "upstream snapshot" and "downstream snapshot," which are used herein, are now explained. Assume that the following named snapshots of a whiteboard are arranged in the order Snapshot1, Snapshot2, Snapshot3, and Snapshot4. Snapshot1 is upstream from each of Snapshot2, Snapshot3, and Snapshot4; Snapshot2 is upstream from each of Snapshot3 and Snapshot4; and Snapshot3 is downstream from each of Snapshot1 and Snapshot2. Furthermore, Snapshot2 can also be referred to as an "immediate downstream snapshot" from Snapshot1 and an "immediate upstream snapshot" from Snapshot3.

The consistency checking tool 514 can validate whether modifications to an upstream (e.g., earlier) whiteboard snapshot invalidate or are inconsistent with a downstream (e.g., later) whiteboard snapshot. The consistency checking tool 514 may be configured with consistency checking rules. In response to an edit to an upstream snapshot, the snapshot tool 512 evaluates at least some of the consistency checking rules to identify whether downstream snapshots are negatively impacted. Which consistency checking rules are executed can depend on the editing operation. The consistency checking tool 514 may notify (e.g. alert) the editing user of any identified inconsistencies and perform a remedial action identified by the user. While a few examples of consistency checking rules are described herein, the disclosure is not so limited and more, fewer, or other consistency checking rules can be implemented by the consistency checking tool 514.

The consistency checking tool 514 may include or be configured with object deletion consistency rules that are executed to ensure that the deletion of any element from an upstream whiteboard snapshot does not render invalid or impossible subsequent edits to the graphical element in downstream snapshots. To illustrate, and without limitations, if a downstream snapshot includes an "set fill color to red" edit for a rectangle included in an upstream snapshot, and that rectangle is later deleted from the upstream snapshot, the consistency checking tool 514 notifies the user of this discrepancy.

The consistency checking tool 514 may include or be configured with reference consistency rules that are executed to ensure that an edit of any element from an upstream whiteboard snapshot does not render invalid or impossible references to the element in downstream snapshots. To illustrate, and without limitations, if a downstream snapshot adds a connecting arrow between a first rectangle added in an upstream snapshot and a second rectangle added in a downstream snapshot and that the first rectangle is later deleted from the upstream snapshot, the consistency checking tool 514 notifies the user that the connecting arrow in the downstream snapshot now lacks its originating reference point, leading to a potential logical discrepancy or incomplete downstream snapshot.

The consistency checking tool 514 may include or be configured with snapshot deletion consistency rules that are executed to ensure that a deletion of an upstream snapshot, as a whole, does not render invalid downstream snapshots. If objects in an upstream snapshot is referenced or modified in any downstream snapshot then that object is moved to the most immediate downstream snapshot.

A remedial action can be to move a graphical element that is to be deleted from an upstream snapshot to a first downstream snapshot that refers to or modifies the graphical element. When a snapshot, as a whole, is deleted, a remedial action can be to delete all graphical elements included in the to-be-deleted snapshot and that are not referenced or modified in downstream snapshots and to move each referenced or modified graphical element to the downstream snapshot that references or modifies the graphical element. Other remedial actions are possible.

The data store 506, and as already mentioned, can store whiteboards (e.g., whiteboard objects), which can include respective structured documents and associated metadata. The data store 506 may store snapshots in association with whiteboards. The data store 506 can also be used to associate any other data, such as those described herein, with whiteboard snapshots. The data store 506 may be a database or other data store that is available at a database server, such as the database server 110 shown in FIG. 1. Whiteboard snapshots can be stored in the data store 506 in any number of ways. In an example, each whiteboard snapshot may be separately stored in the data store 506. In another example, all whiteboard snapshots associated with a whiteboard can be stored in a single object (e.g., a structured document), such as described with respect to FIG. 7.

Figure 6A:
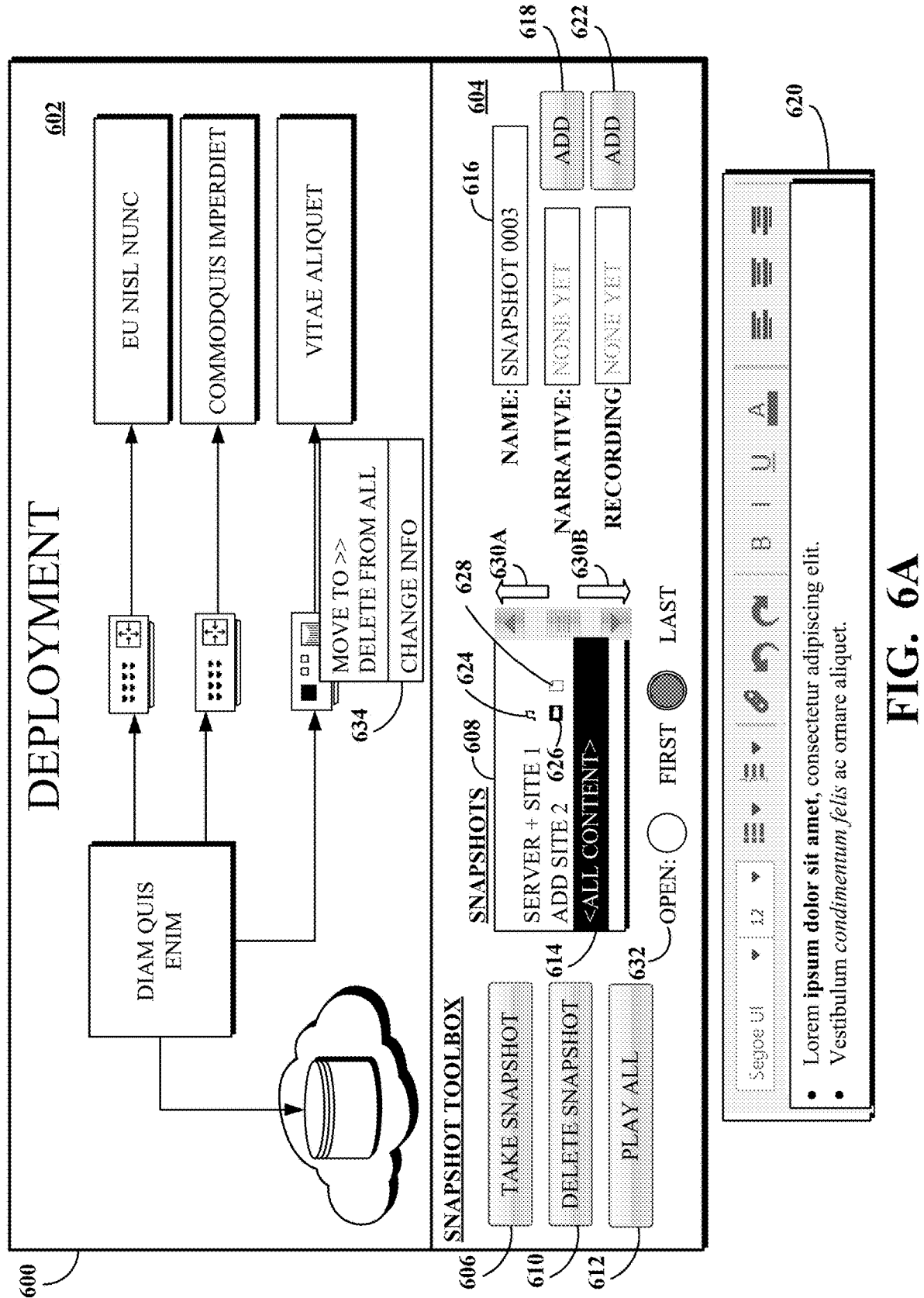
FIG. 6A illustrates an example of a user interface for capturing whiteboard snapshots.

FIG. 6A illustrates an example of a user interface 600 for capturing whiteboard snapshots. The user interface 600 can be generated by the snapshot tool 512 of FIG. 5 and can be presented to a user with modify permission to the whiteboard being edited. The user interface 600 can be displayed at a client, such as the client 502 of FIG. 5. The user interface 600 includes a canvas 602 onto which a graphical representation of the whiteboard has been drawn. The state of the whiteboard shown in FIG. 6A corresponds to the whiteboard state 430 of FIG. 4B. The user interface 600 also includes a snapshot player toolbox 604.

The snapshot player toolbox 604 includes a control 606 that, when invoked, causes a snapshot of the current (e.g., present) state of the whiteboard to be captured and saved. When a snapshot is captured, a list of snapshots 608 is updated to include the captured snapshot. A control 610, when invoked, causes a selected snapshot in the list of snapshots 608 to be deleted. A control 612, when invoked, causes a snapshot viewing user interface, such as that described with respect to FIG. 6B, to be displayed.

Adding a snapshot to the list of snapshots 608 includes adding a representation of the snapshot to the list of snapshots 608. In an example, the representation can include a thumbnail; image of the snapshot for easy and quick reference. In an example, the representation include a default name generated by the snapshot tool 512 or can be a user-provided name. The captured snapshot can be added as the last item in the list of snapshots 608. In an example, the snapshot can be added after a selected snapshot in the list. The list of snapshots 608 can include a default snapshot 614 that represents the current (e.g., latest) state of the whiteboard. The default snapshot 614 can have a default name (e.g., "ALL CONTENT").

When the user selects a snapshot in the list of snapshots 608, the user is able to associate additional information with the selected snapshot. For example, in a field 616, the user can provide a user-specified name to the snapshot. By invoking a control 618, the snapshot tool 512 enables the user to associate a narrative (e.g., a textual annotation) with the selected snapshot. In an example, in response to an invocation of the control 618, the snapshot tool 512 may present an editor 620 enabling the user to create or modify a textual annotation associated with the selected snapshot. In an example, the editor 620 may be a simple editor that enables the user to enter plain text. In an example, and as illustrated in FIG. 6A, the editor 620 can be a What-You-See-Is-What-You-Get (WYSIWYG) rich text editor that enables the user to include text, text formatting, hyperlinks, images, tables, and the like, in the textual annotation. A control 622, when invoked, enables the user to associate one or more media annotations with the selected snapshot. The media can be an audio or an audio-visual annotation.

Icons 624, 626, or 628 may be displayed in association with (e.g., next to) respective snapshots in the list of snapshots 608 to indicate that an audio annotation, an audio-visual annotation, or a textual annotation is associated with the respective snapshots. When one of the icons 624, 626, or 628 is invoked (e.g., clicked), the associated annotation is played or is displayed, as the case may be.

Controls 630A-630B enable a user to reorder the snapshots in the list of snapshots 608. Reordering the snapshots can cause the consistency checking tool 514 to evaluate at least some of the consistency checking rules and apply one or more remedial actions. A control 632 enables the user to set an opening mode for the whiteboard. The opening mode indicates to the whiteboard software 504 the initial state (e.g., the initial snapshot) that the canvas 602 is to be set to when the whiteboard is first opened. A first setting (e.g., "FIRST" in FIG. 6A) indicates that the canvas 602 is to be set (e.g., initialized) to the first snapshot listed in the list of snapshots 608; and a second setting (e.g., "LAST" in FIG. 6A) indicates that the canvas 602 is to be set (e.g., initialized) to the last snapshot (i.e., the default snapshot 614) listed in the list of snapshots 608.

A context menu 634 enables snapshot related actions with respect to graphical elements displayed on the canvas 602. The user may select one or more of the graphical elements and then cause the context menu 634 to displayed.

A first action (e.g., "MOVE TO>>") in the context menu, when invoked, causes the selected graphical elements to be moved (e.g., transferred) to a selected snapshot. Invocation of this option reveals a cascading submenu that displays the list of available snapshots, thereby allowing the user to specify the destination snapshot for the transfer. Consistency check rules may be evaluated and appropriate remedial actions may also be performed.

A second action (e.g., "DELETE FROM ALL") in the context menu, when invoked, causes the selected graphical elements to be deleted from all snapshots. Consistency check rules may be evaluated and appropriate remedial actions may also be performed. A third action (e.g., "CHANGE INFO"), when selected, causes the whiteboard software to show a list of all modifications to the selected graphical elements. To illustrate, and without limitations, the result of invoking the action may essentially include data such as "rectangle added in snapshot1, fill color set to red in snapshot3, text 'hello world' added in snapshot7."

Figure 6B:
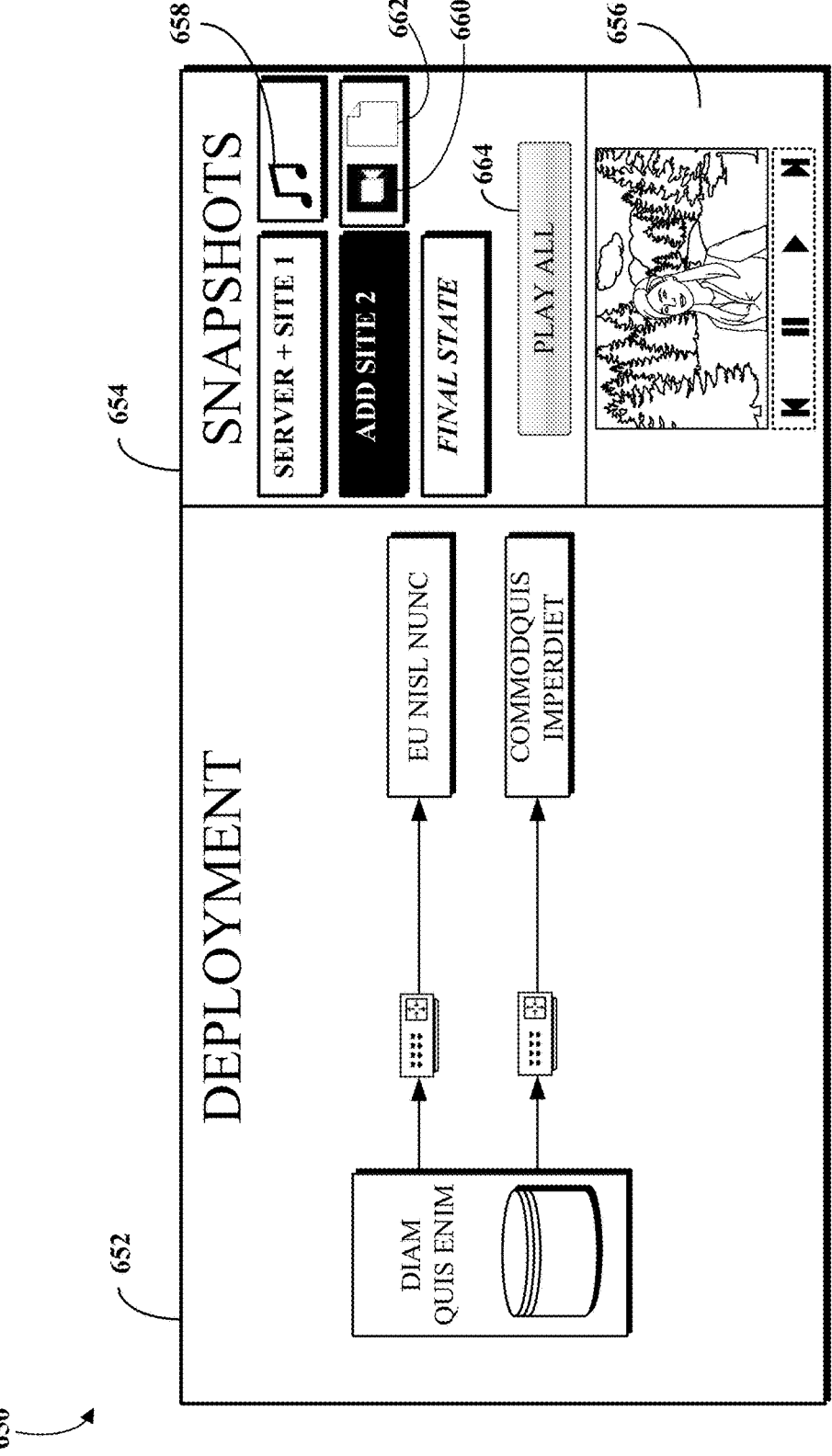
FIG. 6B illustrates an example of a user interface for viewing whiteboard snapshots.

FIG. 6B illustrates an example of a user interface 650 for viewing whiteboard snapshots. The user interface 650 can be generated by the snapshot tool 512 of FIG. 5 and can be presented to a user that does not have modify permission to a whiteboard and/or can be generated by the snapshot tool 512 in response to an invocation of the control 612 (i.e., a play control) of FIG. 6A. The user interface 650 can be displayed at a client, such as the client 502 of FIG. 5. The user interface 650 includes a canvas 652 and a snapshot player toolbox 654.

The snapshot player toolbox 654 includes a list of the snapshots associated with the whiteboard and any associated media or textual annotations. The canvas 652 reflects a snapshot that is selected in the snapshot player toolbox 654. In response to a selection of a snapshot in the snapshot player toolbox 654, the canvas 652 is updated to reflect a whiteboard state saved in the snapshot.

The snapshot player toolbox 654 may include an annotation player 656. If the user selects an audio annotation, such as by clicking an icon 658, then an audio player may be displayed in the annotation player 656 to play the audio annotation; if the user selects an audio-visual annotation, such as by clicking an icon 660, then a video player may be displayed in the annotation player 656 to play the audio-visual annotation; and if the user selects a textual annotation, such as by clicking an icon 662, then the text of the annotation may be displayed in a text field in the annotation player 656.

A control 664, when invoked, causes the snapshot tool 512 of FIG. 5 to sequentially set the canvas to each of the snapshots from the first snapshot to the last snapshot. One snapshot may be displayed for a predefined display duration before the canvas is updated to show the next snapshot. In an example, the user can provide a display duration per snapshot. In an example, if annotations are associated with a snapshot, then those annotations are played before the next snapshot is shown.

FIG. 7 illustrates an example 700 of whiteboard content of a whiteboard. It is noted that, for brevity and ease of explanation, the example 700 does not correspond to the content of the whiteboard shown with respect to FIGS. 6A-6B. The whiteboard content can be stored in a data store, such as the data store 506 of FIG. 5. A whiteboard software, such as the whiteboard software 504 of FIG. 5, can read the whiteboard content and graphically renders the whiteboard content onto a canvas, as described above.

The example 700 illustrates that the whiteboard content includes three snapshots: a first snapshot 702 named (or labeled) "MY_SNAPSHOT_1," a second snapshot 704 named "MY_SNAPSHOT_2," and a third snapshot 706 named "MY_SNAPSHOT_3." In accordance with the whiteboard content of the example 700, a sequential representation of data snapshots can be articulated as follows: The initial snapshot, designated as "MY_SNAPSHOT_1," introduces an object (e.g., a rectangle) identified by "ID" 001 (e.g., an identifier 708). Subsequently, "MY_SNAPSHOT_2" alters the attributes of the object with "ID" 001 by assigning a red fill color, as shown by an alteration 710. Additionally, this snapshot augments the data set with a new object (e.g., another rectangle), denoted by "ID" 002 (e.g., an identifier 712). The third (and final) snapshot, "MY_SNAPSHOT_3," fills the object with "ID" 001 with the text "what went well?" (e.g., an alteration 714) and the object with "ID" 002 with the text "what did not go well?" (e.g., an alteration 716).

To expedite the initial rendering of a whiteboard, the whiteboard content may incorporate a consolidated section 718. This section serves to merges the attributes and graphical elements and changes thereto delineated across all sequential snapshots. The purpose of the consolidated section is to provide a singular, comprehensive view of the whiteboard content, enabling a more efficient loading and display process. By assimilating the modifications and additions from the subsequent snapshots—such as the color assignment to the object in "MY_SNAPSHOT_2" and the textual annotations in "MY_SNAPSHOT_3"—the consolidated section 732 effectively eliminates the need to process each snapshot individually. This results in a more rapid availability of the complete whiteboard content to the user, thereby enhancing the user experience by reducing wait times.

Figure 8:
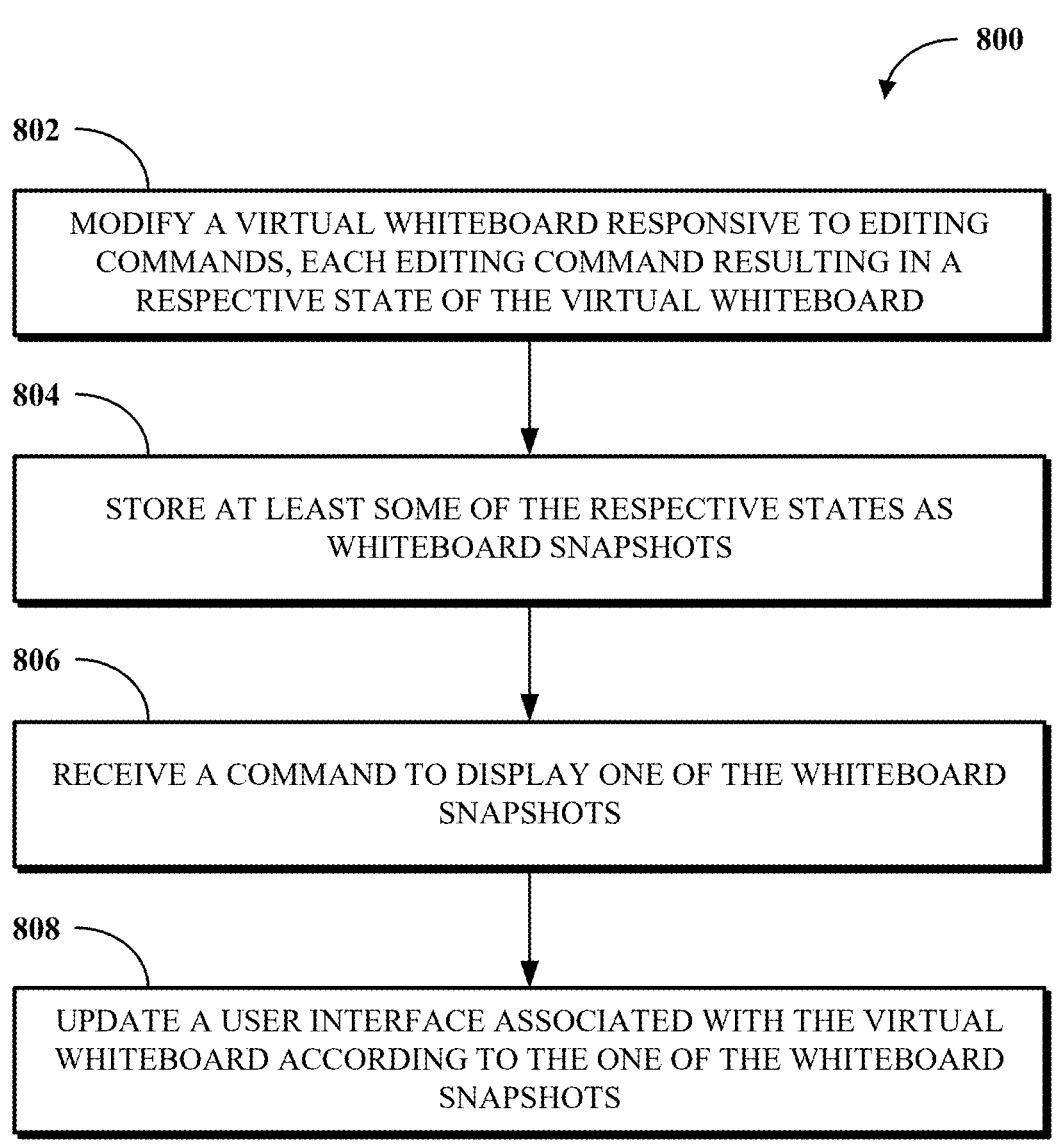
FIG. 8 is a flowchart of an example of a technique for capturing and viewing whiteboard snapshots.

To further describe some implementations in greater detail, reference is next made to examples of techniques which may be performed by or using a system for capturing and viewing whiteboard snapshots. FIG. 8 is a flowchart of an example of a technique 800 for capturing and viewing whiteboard snapshots. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations of the technique 800 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a virtual whiteboard is modified (e.g., updated) responsive to editing commands. Each editing command results in a respective state of the virtual whiteboard. The editing commands can include adding, moving, resizing, or deleting graphical elements. At 804, at least some of the respective states are stored as whiteboard snapshots. The respective states can be stored in response to snapshot capture commands. A snapshot capture command can be as described with respect to the control 606 of FIG. 6A. The snapshots can be stored in a data store, such as the data store 506 of FIG. 5.

Storing the at least some of the respective states as the whiteboard snapshots can include storing, in response to a first snapshot capture command, a first whiteboard snapshot corresponding to a first state; and storing, in response to a second snapshot capture command received after the first snapshot capture command, a second whiteboard snapshot corresponding to a second state. The second whiteboard snapshot can be configured to store differences from the first state to the second state.

The technique 800 can receive one or more commands to associate, and in response associate, one or more of a media (e.g., an audio or an audio-visual) annotation or a textual annotation with the one of the whiteboard snapshots. The technique 800 can receive a request to set, and in response sets, a name with the one of the whiteboard snapshots.

At 806, a command to display one of the whiteboard snapshots is received. The command can be the selection of a whiteboard snapshot from the list of snapshots 608 of FIG. 5A, an invocation of the control 612 of FIG. 5A, a selection of one the whiteboard snapshots listed in FIG. 6B, or an invocation of the control 664 of FIG. 6B. As such, the technique 800 can display a list corresponding to the whiteboard snapshots in the user interface and the command to display the one of the whiteboard snapshots can be received in response to a selection from the list. In an example, the user interface associated with the virtual whiteboard can include navigation tools configured to sequentially update the user interface based on the whiteboard snapshots, such as described, for example, with respect to the control 664 of FIG. 6B. As such, the user interface can be sequentially updated based on the whiteboard snapshots in response to a play command. Each of the whiteboard snapshots can be displayed for predefined display duration.

At 808, a user interface associated with the virtual whiteboard, such as a canvas, is updated according to the one of the whiteboard snapshots. In an example, a media annotation associated with the one of the whiteboard snapshots is also played in response to receiving the command. In an example, a textual annotation associated with the one of the whiteboard snapshots can be displayed in response to receiving the command.

The technique 800 can include updating the user interface based on a first whiteboard snapshot that is upstream from a second whiteboard snapshot. An edit command of a graphical element displayed in the user interface may be received. A determination is made as to whether the graphical element is modified in the second whiteboard snapshot. In response to determining that the graphical element is modified in the second whiteboard snapshot, a notification indicating that graphical element is modified in the second whiteboard snapshot.

The technique 800 can include receiving an edit command of a graphical element; and, in response to the edit command, performing a snapshot consistency check to determine whether the edit command affects downstream whiteboard snapshots. The technique 800 can include receiving a request to delete a graphical element from a first whiteboard snapshot of the whiteboard snapshots; and moving the graphical element to a second whiteboard snapshot that is downstream from the first whiteboard snapshot.

The disclosure presented herein may be considered in view of the following clauses.

Example Clause A: A method that includes: modifying a virtual whiteboard responsive to editing commands, each editing command resulting in a respective state of the virtual whiteboard; storing at least some of the respective states as whiteboard snapshots; receiving a command to display one of the whiteboard snapshots; and updating, based on the command, a user interface associated with the virtual whiteboard according to the one of the whiteboard snapshots.

Example Clause B: The method of Example Clause A, where storing the at least some of the respective states as the whiteboard snapshots includes: storing, in response to a first snapshot capture command, a first whiteboard snapshot corresponding to a first state; and storing, in response to a second snapshot capture command received after the first snapshot capture command, a second whiteboard snapshot corresponding to a second state, where the second whiteboard snapshot stores differences from the first state to the second state.

Example Clause C: The method of Example Clause A or Example Clause B, further including: updating the user interface based on a first whiteboard snapshot that is upstream from a second whiteboard snapshot; receiving an edit command of a graphical element displayed in the user interface; determining whether the graphical element is modified in the second whiteboard snapshot; and in response to determining that the graphical element is modified in the second whiteboard snapshot, providing a notification indicating that the graphical element is modified in the second whiteboard snapshot.

Example Clause D: The method of any one of Example Clauses A-C, further including: receiving an edit command of a graphical element; and in response to the edit command, performing a snapshot consistency check to determine whether the edit command affects downstream whiteboard snapshots.

Example Clause E: The method of any one of Example Clauses A-D, further including: receiving a request to delete a graphical element from a first whiteboard snapshot of the whiteboard snapshots; and moving the graphical element to a second whiteboard snapshot that is downstream from the first whiteboard snapshot.

Example Clause F: The method of any one of Example Clauses A-E, further including: associating a media annotation with the one of the whiteboard snapshots.

Example Clause G: The method of any one of Example Clauses A-F, further including: associating a textual annotation with the one of the whiteboard snapshots.

Example Clause H: The method of any one of Example Clauses A-G, further including: associating a name with the one of the whiteboard snapshots.

Example Clause I: A system that includes one or more memories and one or more processors. The one or more processors is configured to execute instructions stored in the one or more memories to: modify a virtual whiteboard responsive to editing commands, each editing command resulting in a respective state of the virtual whiteboard; store at least some of the respective states as whiteboard snapshots; receive a command to display one of the whiteboard snapshots; and update, based on the command, a user interface associated with the virtual whiteboard according to the one of the whiteboard snapshots.

Example Clause J: The system of Example Clause I, where the one or more processors is further configured to execute instructions stored in the one or more memories to: associate an audio annotation with the one of the whiteboard snapshots.

Example Clause K: The system of Example Clause I or Example Clause J, where the one or more processors is further configured to execute instructions stored in the one or more memories to: associate an audio-visual annotation with the one of the whiteboard snapshots.

Example Clause L: The system of any one of Example Clauses I-K, where the one or more processors is further configured to execute instructions stored in the one or more memories to: display a list corresponding to the whiteboard snapshots in the user interface, where the command to display the one of the whiteboard snapshots is received in response to a selection from the list.

Example Clause M: The system of any one of Example Clauses I-L, where the user interface associated with the virtual whiteboard includes navigation tools configured to sequentially update the user interface based on the whiteboard snapshots.

Example Clause N: The system of any one of Example Clauses I-M, where the one or more processors is further configured to execute instructions stored in the one or more memories to: sequentially update the user interface based on the whiteboard snapshots in response to a play command.

Example Clause O: Non-transitory computer readable media storing instructions operable to cause one or more processors to perform operations that include: modifying a virtual whiteboard responsive to editing commands, each editing command resulting in a respective state of the virtual whiteboard; storing at least some of the respective states as whiteboard snapshots; receiving a command to display one of the whiteboard snapshots; and updating, based on the command, a user interface associated with the virtual whiteboard according to the one of the whiteboard snapshots.

Example Clause P: The non-transitory computer readable media of Example Clause O, where modifying the virtual whiteboard includes: adding, moving, resizing, or deleting graphical elements in response to the editing commands.

Example Clause Q: The non-transitory computer readable media of Example Clause O or Example Clause P, where the operations further include: playing a media annotation associated with the one of the whiteboard snapshots in response to receiving the command.

Example Clause R: The non-transitory computer readable media of any one of Example Clauses O-Q, where the operations further include: displaying a textual annotation associated with the one of the whiteboard snapshots in response to receiving the command.

Example Clause S: The non-transitory computer readable media of any one of Example Clauses O-R, where the operations further include: displaying a list of the whiteboard snapshots.

Example Clause T: The non-transitory computer readable media of any one of Example Clauses O-S, where the operations further include: sequentially displaying the whiteboard snapshots in response to a play command, where each of the whiteboard snapshots is displayed for predefined display duration.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

modifying a virtual whiteboard responsive to editing commands, each editing command resulting in a respective state of the virtual whiteboard;

storing at least some of the respective states as whiteboard snapshots;

receiving a command to display one of the whiteboard snapshots;

updating, based on the command, a user interface associated with the virtual whiteboard according to the one of the whiteboard snapshots;

receiving an edit command of a graphical element; and in response to the edit command, performing a snapshot consistency check to determine whether the edit command affects downstream whiteboard snapshots.

2. The method of claim 1, wherein storing the at least some of the respective states as the whiteboard snapshots comprises:

storing, in response to a first snapshot capture command, a first whiteboard snapshot corresponding to a first state; and storing, in response to a second snapshot capture command received after the first snapshot capture command, a second whiteboard snapshot corresponding to a second state, wherein the second whiteboard snapshot stores differences from the first state to the second state.

3. The method of claim 1, further comprising:

updating the user interface based on a first whiteboard snapshot that is upstream from a second whiteboard snapshot;

receiving an edit command of a graphical element displayed in the user interface;

determining whether the graphical element is modified in the second whiteboard snapshot; and in response to determining that the graphical element is modified in the second whiteboard snapshot, providing a notification indicating that the graphical element is modified in the second whiteboard snapshot.

4. The method of claim 1, further comprising:

receiving a request to delete a graphical element from a first whiteboard snapshot of the whiteboard snapshots; and moving the graphical element to a second whiteboard snapshot that is downstream from the first whiteboard snapshot.

5. The method of claim 1, further comprising:

associating a media annotation with the one of the whiteboard snapshots.

6. The method of claim 1, further comprising:

associating a textual annotation with the one of the whiteboard snapshots.

7. The method of claim 1, further comprising:

associating a name with the one of the whiteboard snapshots.

8. The method of claim 1, further comprising:

in response to determining that the edit command affects the downstream whiteboard snapshots, applying the edit command to at least one of the downstream whiteboard snapshots; and updating the at least one of the downstream whiteboard snapshots to reflect the edit command.

9. A system, comprising:

one or more memories; and one or more processors, the one or more processors configured to execute instructions stored in the one or more memories to:

modify a virtual whiteboard responsive to editing commands, each editing command resulting in a respective state of the virtual whiteboard;

store at least some of the respective states as whiteboard snapshots;

receive a command to display one of the whiteboard snapshots;

update, based on the command, a user interface associated with the virtual whiteboard according to the one of the whiteboard snapshots;

receive an edit command of a graphical element; and in response to the edit command, perform a snapshot consistency check to determine whether the edit command affects downstream whiteboard snapshots.

10. The system of claim 9, wherein the one or more processors is further configured to execute instructions stored in the one or more memories to:

associate an audio annotation with the one of the whiteboard snapshots.

11. The system of claim 9, wherein the one or more processors is further configured to execute instructions stored in the one or more memories to:

associate an audio-visual annotation with the one of the whiteboard snapshots.

12. The system of claim 9, wherein the one or more processors is further configured to execute instructions stored in the one or more memories to:

display a list corresponding to the whiteboard snapshots in the user interface, wherein the command to display the one of the whiteboard snapshots is received in response to a selection from the list.

13. The system of claim 9, wherein the user interface associated with the virtual whiteboard includes navigation tools configured to sequentially update the user interface based on the whiteboard snapshots.

14. The system of claim 9, wherein the one or more processors is further configured to execute instructions stored in the one or more memories to:

sequentially update the user interface based on the whiteboard snapshots in response to a play command.

15. Non-transitory computer readable media storing instructions operable to cause one or more processors to perform operations comprising:

modifying a virtual whiteboard responsive to editing commands, each editing command resulting in a respective state of the virtual whiteboard;

storing at least some of the respective states as whiteboard snapshots;

receiving a command to display one of the whiteboard snapshots;

updating, based on the command, a user interface associated with the virtual whiteboard according to the one of the whiteboard snapshots;

receiving an edit command of a graphical element; and in response to the edit command, performing a snapshot consistency check to determine whether the edit command affects downstream whiteboard snapshots.

16. The non-transitory computer readable media of claim 15, wherein modifying the virtual whiteboard comprises:

adding, moving, resizing, or deleting graphical elements in response to the editing commands.

17. The non-transitory computer readable media of claim 15, wherein the operations further comprise:

playing a media annotation associated with the one of the whiteboard snapshots in response to receiving the command.

18. The non-transitory computer readable media of claim 15, wherein the operations further comprise:

displaying a textual annotation associated with the one of the whiteboard snapshots in response to receiving the command.

19. The non-transitory computer readable media of claim 15, wherein the operations further comprise:

displaying a list of the whiteboard snapshots.

20. The non-transitory computer readable media of claim 15, wherein the operations further comprise:

sequentially displaying the whiteboard snapshots in response to a play command, wherein each of the whiteboard snapshots is displayed for predefined display duration.

\* \* \* \* \*